June 23, 1936.  A. E. URBAN  2,044,821
FERTILIZER IMPLEMENT
Original Filed July 21, 1932
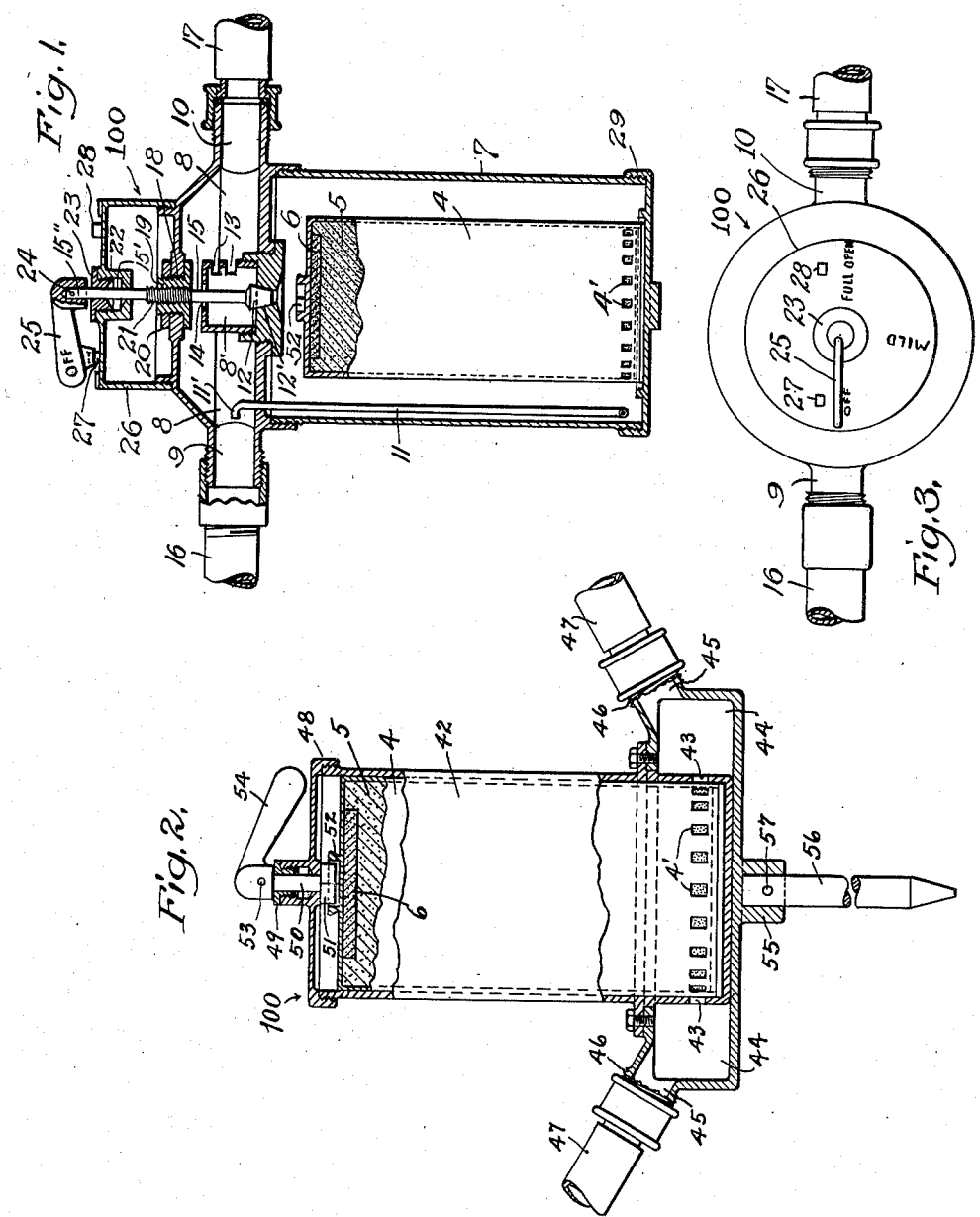
INVENTOR
Alfred E. Urban.
BY
Wm G. Blomstran.
HIS ATTORNEY.

Patented June 23, 1936

2,044,821

UNITED STATES PATENT OFFICE 2,044,821

FERTILIZER IMPLEMENT

Alfred E. Urban, St. Charles, Ill., assignor to American Hydrolizer Company, Elmhurst, Ill., a corporation of Illinois Application July 21, 1932, Serial No. 623,796
Renewed May 11, 1936

3 Claims. (Cl. 299—84)

This invention relates in general to devices used in dispensing manufactured dry chemical fertilizers to lawns and vegetation in general, but more particularly it has reference to improvements in fertilizer implements adapted to dissolve the dry chemical fertilizer and dispense it directly in a liquid form through the medium of the hose used in watering lawns, plants, and vegetation in general, and to automatically indicate when the fertilizing medium has been exhausted.

It is, therefore, an important object of the invention to provide a dry chemical fertilizer implement which dispenses and distributes the chemical in, as before stated, a liquid form, and in any desired proportion according to the amount required, and, substantially, evenly throughout its distribution during the period of watering operations.

Another important object of the invention contemplates an implement for dispensing and distributing a dry chemical fertilizer in a liquid form, and for controlling the output of the liquid chemical from the implement.

Another important object of the invention contemplates the provision of means for gradually liquifying the dry chemical and for simultaneously controlling the input of water or liquifying medium into the implement, and the output of the liquid chemical from the implement to the extent that the chemical output will not be dangerous to the foliage of young vegetation, shrubs, or such as it may be.

Another important object of the invention contemplates the provision of means for charging, and of recharging, the implement with a cartridge containing a dry chemical fertilizer, means to liquify the chemical prior to its being dispensed from the implement and distributed with the water being used to water lawns, gardens, or such as it may be.

A further important object of the invention contemplates watering and fertilizing lawns, or such as it may be, in one and the same operation in such proportion of chemical as desired.

A further important object of the invention contemplates cutting the cost of watering and fertilizing to a very appreciable extent and, of performing such operation with a minimum loss of the fertilizing material, and, without having to employ any amount of extra labor, or to employ subsequent watering operations.

The invention further contemplates the provision of an implement, having the above stated characteristics, which will be neat, strong, and durable, and which may be manufactured at a comparatively very small cost, and which will be simple of operation.

It may be further stated that in the present method of performing fertilizing operation, the fertilizing material is handled from bags. This manner of handling is quite wasteful and necessarily expensive in, that, taking the material from a bag to spread it, which is more or less of guess work, over the soil, much finds its way upon tender foliage and stems where its presence is very dangerous, and much is lost and wasted from spilling. But with my invention such wastefulness and expense is substantially, if not all overcome.

These and other objects of the invention will be better understood from views illustrated in the accompanying drawing, and more fully described in the following specification, and more particularly pointed out in the appended claims.

In the accompanying drawing:

Figure 1 is a vertical sectional view of the invention as attached to a water supply pipe extending out through the wall of a building where, generally, a shut-off valve and provision for attaching a hose is provided;

Figure 2 is a vertical sectional view of a portable fertilizer implement embodying the invention in a modified form and is shown inserted in a line of watering hose; and as supported in the ground at any suitable place; and, Figure 3 is plan view of Figure 1.

Similar characters refer to similar parts throughout the several views.

In the several views the invention is indicated, generally, by the reference character, 100. It being adapted to receive, interchangeably, a receptacle or cartridge 4, in which is packed a dry chemical fertilizer 5. Inserted behind the packed chemical at the upper end of cartridge 4, is a pad 6, containing coloring matter which, preferably, is of a bright red color and instantly soluble in water.

Enclosing cartridge 4, is a casing or vessel 7, which provides a container for water. At one end of casing 7, is provided a chamber or water passage 8, having, respectively, inlet and outlet openings 9, and 10. Connecting chamber 8, with the interior of casing 7 is a bent water inlet tube 11. Suitably located in the upper part of casing 7, is disposed a liquid chemical outlet valve 12. The valve not only regulates the flow of the supply water or dissolving medium into casing 7, but also the flow of the dissolved or liquified dry chemical from casing 7, out through valve opening 12', into chamber 8', whence it flows into chamber 8, and out through outlet 10, and through a watering hose 17.

The chamber 8, is provided with an auxiliary chamber 8', disposed over valve opening 12', the side walls of which having lateral outlet openings 13, arranged to face toward outlet opening 10, or in the direction of the flow of the supply water which flows through chamber 8. An opening 14, is provided centrally through the top wall of chamber 8', through which valve stem 15, extends. It will be noted in Figure 1, that inlet tube 11, extends into chamber 8, and that its end is bent toward inlet opening 9, as at 11', or in the opposite direction of the flow of the supply water which flows through chamber 8, that is, from supply pipe 16, into inlet 9, to outlet 10. With openings 13, and the bent direction of tube 11, as at 11', being arranged in the manner described, and, together with casing 7, a by-pass is formed through which a portion of the supply water is permitted to flow, and, at the same time, dissolve the dry chemical fertilizer, by entering through perforations 4', of cartridge 4, and form a liquid chemical fertilizer, which, on entering chamber 8, is carried along with the water supply as it flows through outlet 10, and through a watering hose 17, substantially as in the manner of an injector.

For homes and other kinds of buildings, and for green-houses, the installation of the implement or apparatus 100, may be made in the manner indicated in Figure 1. The installation in this instance being, however, as made at a building which may be a home, or a factory, about which a lawn or a garden is being grown.

Through a screw threaded opening 18, formed in the upper wall of chamber 8, and centrally over valve 12, is inserted an internally and externally screw-threaded nut 19, it being locked in place by a lock-nut 20. A screw-thread portion 21, of valve stem 15, is threaded through said nut 19, and the upper portion 15' of the valve stem extends up through a stuffing box 22, and a packing gland 23, and, to its outer end 15'', is fastened, as by a pin 24, a valve operating lever 25. The stuffing box 22, is formed in a screw cap 26, on top of which are stop lugs 27, and 28, toward which lever 25, is turned to either a valve opened or closed position. Lugs 27, and 28, being adapted to engage, or rather prevent, valve lever from being turned more than is necessary to open and close valve 12. In this case, valve lever 25, being turned toward and nearly against lug 27, the valve is closed, and on turning the lever against lug 28, the valve is fully opened. To visibly indicate the several positions of valve 12, notations, such as Off, at or opposite lug 27, Full open, at or opposite lug 28, and Mild, substantially midway of the travel of lever 25, are provided as is shown in Fig. 3. These several notations being arranged in their respective places, as is indicated in Figure 3, as stated, indicate, besides the open and closed position of valve 12, a proportionate amount of liquid chemical being permitted to flow out through valve opening 12', from casing 7, into chamber 8. Other notations, as Weak, between Off and Mild, and Strong, between Mild and Full Open, may be used to indicate where to turn the valve lever to permit such indicated amount of liquid chemical to flow into and mix with the water used in a watering and fertilizing operation, as may be desired or required. In place of the notations mentioned, percentage marks may be used instead.

When it becomes necessary to exchange an exhausted cartridge for one that is fully charged with dry chemical fertilizer, the exhaustion of the present cartridge being indicated by the red colored water flowing from the hose, the water being made red by the above mentioned coloring matter, it is only necessary to remove screw cap 29, which supports the cartridge, from casing 7, take the present cartridge out from the casing and cap 29, and replace it with a loaded one, and screw the casing and cap 29, with the new cartridge, tightly back in place.

It may be here stated that watering operations may be performed with the supply water flowing only through chamber 8, simply by closing valve 12, thereby preventing any possibility of any liquid chemical fertilizer flowing and mixing with the supply when only plain watering operations are required.

In Figure 2, is represented a modified form of the invention, and provides a portable fertilizer.

The implement, like that shown in Figure 1, contains a dry chemical cartridge 4, substantially like that already described. However, in this instance, it provides a rotatory valve workably fitting in a receptacle or casing 42, having perforations or openings 43, which are arranged at or near its lower end in co-operative relation to openings 4', of the cartridge. Around casing 42, and over openings 43, is provided an annular chamber 44, having opposite inlet and outlet openings 45, having externally screw threaded ends 46, whereby connection may be made between ends of watering hoses 47. Screwed to the upper end of casing 42 is a stuffing box 48, into which is screwed a packing gland 49. And through the stuffing box and gland is inserted a rod 50, which extends out beyond the gland and below the stuffing box. The lower end of the rod is provided with a square end 51, which is adapted to fit a square recess 52, in the cartridge. To the upper end of the rod is fastened, as by means of a pin 53, a turning handle or lever 54.

In a boss 55, centrally provided on the underside of chamber 44, is inserted a strong rod 56, and there fastened as by a pin 57. The rod is pointed at its lower end to provide easy insertion into the ground wherever it is convenient to locate the implement to perform fertilizing operations.

To regulate and control the amount of dry chemical being dissolved and formed into a liquid fertilizer, and which may be carried away by the supply water flowing through chamber 44, it becomes only necessary to rotate the cartridge, by means of hand lever 54, through such a degree as will give the proper size opening made by moving the co-relative openings 4' and 43 opposite to each other to a greater or less degree, that is, to larger or smaller openings, as desired.

Having thus described my invention it can be readily understood that the minor details of construction of the invention may be altered in several ways without departing from the spirit and scope of the invention, and without losing any of its attendant advantages. Therefore, what is claimed is desired to be secured by Letters Patent:

I claim:

1. The combination in an implement, of the character described, comprising a vessel or casing for containing water and having a separate chamber formed thereon, said chamber having an inlet and an outlet opening through which the main water supply may flow in continuity, said vessel having a detachable screw cap secured at its lower end removably supporting within said vessel a cartridge containing a dry fertilizer chemical and soluble coloring matter, means for connecting said chamber with the interior of said vessel, a controlling valve for controlling the flow of liquid chemcal from said vessel to the said chamber, said coloring matter being suitably disposed in said cartridge and supported by said chemical, and means, as notations, arranged to indicate the position to which to set said valve whereby to control the mixing of said liquid chemical with the watering medium.

2. A portable implement, of the character described, comprising the combination, of a receptacle or cartridge for containing a supply of dry fertilizer chemical, said cartridge being adapted to form a valve, said receptacle having a series of lateral openings arranged in its wall at the lower end thereof and having a square recess formed in its upper end, a square ended key adapted to fit said recess and rotate said valve, a casing in which to insert said cartridge, said cartridge and casing being adapted to workably fit each other, an annular water passage or chamber having inlet and outlet openings therefor through which water may flow in continuity surrounding said casing, a series of corresponding openings arranged in the wall of said valve and disposed opposite the openings in said cartridge, a screw cap detachably secured to said casing, means, comprising said square ended key, extending through said cap adapted to engage the recess n said cartridge and rotate the cartridge so as to bring the said openings into and out of co-operative relation with respect to each other so as to regulate the amount of chemical being dissolved and dispensed, coloring matter suitably disposed in said cartridge and supported by the said chemical, and means to indicate, as by coloring the watering medium, whether or not the dry chemical has become exhausted during a period of fertilization.

3. A fertilizer implement, of the character described, having a casing for receiving a chemical cartridge, and having a screw cap for supporting said cartridge, a cartridge containing a supply of dry fertilizer chemical and soluble coloring matter disposed in the upper part of said cartridge and above the chemical, means through the lower end of the side wall of said cartridge through which water may flow and gradually dissolve said chemical and form a liquid fertilizer, means to dispense said liquid fertilizer in various proportions into the watering medium during watering and fertilizing operations, said coloring matter being adapted to color the main water supply after the said chemical has become exhausted, said cap being adapted to be removed whereby to remove said cartridge without having to disconnect the implement from its place of installation or remove any hose connections secured thereto.

ALFRED E. URBAN.